US008592352B2

(12) United States Patent
Karcher et al.

(10) Patent No.: US 8,592,352 B2
(45) Date of Patent: Nov. 26, 2013

(54) CEMENT COMPOSITIONS COMPRISING PARTICULATE FOAMED ELASTOMERS AND ASSOCIATED METHODS

(75) Inventors: Jeffery D. Karcher, Duncan, OK (US);
Benjamin J. Iverson, Duncan, OK (US);
Christopher L. Gordon, Oklahoma City, OK (US); Robert P. Darbe, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/453,727

(22) Filed: Apr. 23, 2012

(65) Prior Publication Data
US 2012/0202901 A1 Aug. 9, 2012

Related U.S. Application Data

(62) Division of application No. 12/484,715, filed on Jun. 15, 2009.

(51) Int. Cl.
*C09K 8/473* (2006.01)

(52) U.S. Cl.
USPC .................. 507/224; 507/219; 166/305.1

(58) Field of Classification Search
CPC ...................................... C09K 8/473
USPC .............. 507/219, 224; 166/305.1
See application file for complete search history.

(56) References Cited

U.S. PATENT DOCUMENTS

| | | | |
|---|---|---|---|
| 4,127,548 A * | 11/1978 | Alexander ................. | 524/4 |
| 4,201,670 A | 5/1980 | Baur | |
| 4,588,032 A | 5/1986 | Wigand et al. | |
| 4,716,965 A | 1/1988 | Bol et al. | |
| 4,818,288 A | 4/1989 | Aignesberger et al. | |
| 4,892,891 A | 1/1990 | Close | |
| 4,919,989 A | 4/1990 | Colangelo | |
| 4,936,386 A | 6/1990 | Colangelo | |
| 5,048,605 A | 9/1991 | Toon et al. | |
| 5,195,583 A | 3/1993 | Toon et al. | |
| 5,657,822 A | 8/1997 | James et al. | |
| 5,810,085 A | 9/1998 | James et al. | |
| 6,017,854 A | 1/2000 | Van Slyke | |
| 6,431,282 B1 | 8/2002 | Bosma et al. | |
| 6,508,305 B1 | 1/2003 | Brannon et al. | |
| 6,518,224 B2 | 2/2003 | Wood | |
| 6,593,402 B2 | 7/2003 | Chatterji et al. | |
| 6,645,288 B1 | 11/2003 | Dargaud et al. | |
| 6,668,927 B1 | 12/2003 | Chatterji et al. | |
| 6,681,856 B1 | 1/2004 | Chatterji et al. | |
| 6,685,387 B2 | 2/2004 | Allen et al. | |
| 6,832,651 B2 | 12/2004 | Ravi et al. | |
| 6,834,725 B2 | 12/2004 | Whanger et al. | |
| 6,840,325 B2 | 1/2005 | Stephenson | |
| 6,848,505 B2 | 2/2005 | Richard et al. | |
| 6,852,676 B1 | 2/2005 | Chatterji et al. | |
| 6,854,522 B2 | 2/2005 | Brezinski et al. | |
| 6,902,001 B2 | 6/2005 | Dargaud et al. | |
| 6,907,937 B2 | 6/2005 | Whanger et al. | |
| 6,976,542 B2 | 12/2005 | Henriksen et al. | |
| 7,007,755 B2 | 3/2006 | Reddy et al. | |
| 7,059,415 B2 | 6/2006 | Bosma et al. | |
| 7,138,446 B2 | 11/2006 | Reddy et al. | |
| 7,172,022 B2 | 2/2007 | Reddy et al. | |
| 7,607,482 B2 | 10/2009 | Roddy | |
| 2004/0020662 A1 | 2/2004 | Freyer | |
| 2004/0123983 A1 | 7/2004 | Cook et al. | |
| 2004/0144537 A1 | 7/2004 | Reddy et al. | |
| 2004/0144538 A1 | 7/2004 | Richard et al. | |
| 2004/0180794 A1 | 9/2004 | Reddy et al. | |
| 2004/0194971 A1 | 10/2004 | Thomson | |
| 2004/0244978 A1 | 12/2004 | Shaarpour | |
| 2005/0061206 A1 | 3/2005 | Reddy et al. | |
| 2005/0092485 A1 | 5/2005 | Brezinski et al. | |
| 2005/0110217 A1 | 5/2005 | Wood et al. | |
| 2005/0113260 A1 | 5/2005 | Wood | |
| 2005/0113262 A1 | 5/2005 | Ravi et al. | |
| 2005/0167109 A1 | 8/2005 | Hepburn et al. | |
| 2005/0173130 A1 | 8/2005 | Richard | |
| 2005/0199401 A1 | 9/2005 | Patel et al. | |
| 2005/0205263 A1 | 9/2005 | Richard | |
| 2005/0241831 A1 | 11/2005 | Steele et al. | |
| 2005/0252651 A1 | 11/2005 | Bosma et al. | |
| 2005/0252657 A1 | 11/2005 | Tocalino et al. | |
| 2006/0213663 A1 | 9/2006 | Vargo et al. | |

(Continued)

FOREIGN PATENT DOCUMENTS

| | | |
|---|---|---|
| DE | 19802602 | 8/1999 |
| GB | 1342063 | 12/1973 |

(Continued)

OTHER PUBLICATIONS

Bybee, Karen, "Deployment of Swelling-Elastomer Packers," Completions Today, pp. 45-46, Sep. 2005.

(Continued)

*Primary Examiner* — Alicia Toscano
(74) *Attorney, Agent, or Firm* — Craig Roddy; Baker Botts L.L.P.

(57) ABSTRACT

Methods of subterranean cementing involving cement compositions comprising particulate foamed elastomers and associated methods are provided. In one embodiment, the cement composition comprises a hydraulic cement, a particulate foamed elastomer, and an aqueous fluid. In one embodiment, the particulate foamed elastomer may comprise polyurethane foam.

18 Claims, No Drawings

(56) References Cited

U.S. PATENT DOCUMENTS

| | | | |
|---|---|---|---|
| 2007/0017676 A1 | 1/2007 | Reddy et al. | |
| 2007/0056735 A1 | 3/2007 | Bosma et al. | |
| 2007/0151730 A1 | 7/2007 | Reddy et al. | |
| 2008/0017376 A1* | 1/2008 | Badalamenti et al. | 166/292 |
| 2008/0087431 A1* | 4/2008 | Willauer et al. | 166/290 |
| 2008/0142221 A1* | 6/2008 | Robisson et al. | 166/292 |
| 2009/0071650 A1 | 3/2009 | Roddy | |

FOREIGN PATENT DOCUMENTS

| | | | |
|---|---|---|---|
| GB | 1342063 A | * | 12/1973 |
| GB | 2396635 | | 12/2003 |
| GB | 2396869 | | 12/2003 |
| GB | 2414259 | | 1/2004 |
| GB | 2416796 | | 9/2004 |
| GB | 2414495 | | 5/2005 |
| GB | 2429725 | | 5/2006 |
| WO | 0220941 | | 3/2002 |
| WO | 02059452 | | 8/2002 |
| WO | 02090714 | | 11/2002 |
| WO | 03008756 | | 1/2003 |
| WO | 2004027209 | | 4/2004 |
| WO | 2004057715 | | 7/2004 |
| WO | 2004067906 | | 8/2004 |
| WO | 2004072439 | | 8/2004 |
| WO | 2004101951 | | 11/2004 |
| WO | 2004101952 | | 11/2004 |
| WO | 2005012686 | | 2/2005 |
| WO | 2005031111 | | 4/2005 |
| WO | 2005059304 | | 6/2005 |
| WO | 2005103443 | | 11/2005 |
| WO | 2005116394 | | 12/2005 |
| WO | 2006053896 | | 5/2006 |
| WO | 2006065144 | | 6/2006 |
| WO | 2006098631 | | 9/2006 |
| WO | 2006118470 | | 11/2006 |
| WO | 2006121340 | | 11/2006 |
| WO | 2006121341 | | 11/2006 |
| WO | 2009047496 | | 4/2009 |
| WO | 2010061163 | | 6/2010 |

OTHER PUBLICATIONS

Carter, Neale, "Packers allow splice-free cable runs," Intelligent Wells/Completions, E&P, pp. 86-87, Sep. 2005.

Ghiselin, Dick, "A swell idea simplifies completions," Completion Equipment, E&P, pp. 51-52, May 2005.

Kennedy, Gerry, "Swell packers boost brownfield pay," Brownfield Development, E&P, pp. 37-39, Aug. 2005.

Easywell, "Swellpacker for Water-Based Mud (Achieve complete zonal isolation of producing zones)," Swellpacker.

Easywell, "Swellpacker for Spliceless Feed Through (Achieve complete zonal isolation in smart wells and reduce completion cost)," Swellpacker Cable.

Easywell, "Swellpacker for High Pressure (Achieve complete zonal isolation of producing zones)," Swellpacker hp.

Easywell, "Swellpacker for High Temperature (Achieve complete zonal isolation of producing zones)," Swellpacker ht.

Easywell, "Swellpacker for Oil-Based Mud (Achieve complete zonal isolation of producing zones)," Swellpacker obm.

Easywell, "Combination of Swellpacker™ Technology and Cement (Achieve total zonal isolation for well productivity and longevity)," Swellpacker cement assurance.

Easywell, "Manage annular fluid flow," Constrictor™.

Easywell, "Simple, automated in-flow control," Oil Selector™.

Easywell, "Performance without compromise unique downhole technologies".

Onan, D.D., "Elastomeric Composites for Use in Well Cementing Operations," Society of Petroleum Engineers, Inc., SPE 26572, 1982.

Reddy, B.R., "Self-Healing Cements that Heal Without Dependence on Fluid Contact," Society of Petroleum Engineers, Inc., SPE 121555, 2009.

PCT Search Report (PCT/GB2010/001148), dated Sep. 20, 2010.

* cited by examiner

CEMENT COMPOSITIONS COMPRISING PARTICULATE FOAMED ELASTOMERS AND ASSOCIATED METHODS

CROSS REFERENCE TO RELATED APPLICATIONS

This application is a divisional of co-pending U.S. patent application Ser. No. 12/484,715, filed Jun. 15, 2009, which is herein incorporated by reference.

BACKGROUND

The present invention relates to cementing operations and, more particularly, in certain embodiments, to cement compositions comprising particulate foamed elastomers and associated methods.

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

Set cement in wells, and particularly the set cement sheath in the annulus of a well, may fail due to, inter alia, shear, tensile and compressional stresses exerted on the set cement. There are several stressful conditions that have been associated with well bore cement failures. One example of such a condition results from the relatively high fluid pressures and/or temperatures inside of the set casing during testing, perforation, fluid injection, or fluid production. If the pressure and/or temperature inside the pipe increases, the resultant internal pressure may expand the pipe, both radially and longitudinally. This expansion generally may place stress on the cement surrounding the casing causing it to crack, or the bond between the outside surface of the pipe and the cement sheath to fail in the form of, inter alia, loss of hydraulic seal. Another example of such a stressful condition is where the fluids trapped in a cement sheath thermally expand potentially causing high pressures within the sheath itself. This condition often occurs as a result of high temperature differentials created during production or injection of high temperature fluids through the well bore, e.g., wells subjected to steam recovery processes or the production of hot formation fluids. Other stressful conditions that can lead to cement failures include the forces exerted by shifts in the subterranean formations surrounding the well bore or other overburdened pressures.

Failure of cement within the well bore can result in cracking of the cement as well as a breakdown of the bonds between the cement and the pipe or between the cement sheath and the surrounding subterranean formations. Such failures can result in at least lost production, environmental pollution, hazardous rig operations, and/or hazardous production operations. A common result is the undesirable presence of pressure at the well head in the form of trapped gas between casing strings. Additionally, cement failures can be particularly problematic in multi-lateral wells, which include vertical or deviated (including horizontal) principal well bores having one or more ancillary, laterally extending well bores connected thereto.

Elastomeric materials, such as rubber particles, have previously been included in cement compositions to modify the mechanical properties of the set cement, including Young's Modulus, Poisson's Ration, and the compressive and tensile strength. However, these elastomeric materials may segregate during the placing and setting of the cement, leading to an undesirable density gradient in the set cement.

SUMMARY

The present invention relates to cementing operations and, more particularly, in certain embodiments, to cement compositions comprising particulate foamed elastomers and associated methods.

An embodiment of the present invention provides a method comprising introducing a cement composition into a subterranean location, wherein the cement composition comprises a hydraulic cement, a particulate foamed elastomer, and an aqueous fluid; and allowing the cement composition to set in the subterranean location.

Another embodiment of the present invention provides a method comprising introducing a cement composition into a space between a pipe string and a subterranean formation, wherein the cement composition comprises a hydraulic cement, a particulate foamed elastomer, and an aqueous fluid; and allowing the cement composition to set in the space.

In yet another embodiment, the present invention provides a cement composition comprising: a hydraulic cement, a particulate foamed elastomer, and an aqueous fluid.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, in certain embodiments, to cement compositions comprising particulate foamed elastomers and associated methods.

There may be several potential advantages to the methods and compositions of the present invention, only some of which may be alluded to herein. One of the many potential advantages of the methods and compositions of the present invention is that the mechanical properties of the cement composition may be adjusted so that the cement composition has more desirable properties for a particular purpose. Another potential advantage of the methods and compositions of the present invention is that the use of particulate foamed elastomers may solve problems associated with segregation of the elastomers during the setting of the cement composition. In some embodiments, another potential advantage is that particulate foamed elastomers included in the cement compositions of the present invention may swell when contacted by gas, hydrocarbons, and/or water thus providing "self-healing" properties in the event the cement sheath is damaged or cracked. The increased surface area of the particulate foamed elastomer may facilitate a quicker response to a fluid infiltrating a cracked cement matrix such that the particulate foamed elastomer may swell to fill the crack in a timely manner.

In certain embodiments, cement compositions of the present invention generally comprise a cement, a particulate foamed elastomer, and an aqueous fluid. Those of ordinary skill in the art will appreciate that the cement compositions generally should have a density suitable for a particular application. By way of example, cement compositions of the present invention may have a density of from about 4 pounds per gallon ("lb/gal") to about 20 lb/gal. In certain embodiments, the cement compositions may have a density of from about 8 lb/gal to about 17 lb/gal. Cement compositions of the present invention may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

As described above, the cement compositions of the present invention comprise a cement. Any of a variety of cements suitable for use in subterranean cementing operations may be used in accordance with embodiments of the present invention. Suitable non-limiting examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements, cement kiln dust ("CKD"), and combinations thereof. "CKD," as that term is used herein, refers to a partially calcined kiln feed which may be removed from the gas stream and collected in a dust collector during the manufacture of cement. CKD generally may comprise a variety of oxides, such as $SiO_2$, $Al_2O_3$, $Fe_2O_3$, CaO, MgO, $SO_3$, $Na_2O$, and $K_2O$. In certain embodiments, the hydraulic cement may comprise a Portland cement. The Portland cements that may be suited for use in embodiments of the present invention are classified as Class A, C, H and G cements according to American Petroleum Institute, *API Specification for Materials and Testing for Well Cements*, API Specification 10A, 23rd Ed., Apr. 1, 2002.

In some embodiments, the cement compositions of the present invention comprise a particulate foamed elastomer. In general, particulate foamed elastomers suitable for use in the present invention may have an open cell structure that is permeable to both the dry and wet constituents of the cement slurry. It is believed that this structure may facilitate the mixing and dispersion of the cement slurry and the adhesion of the particles to the set cement. Therefore, suitable particulate foamed elastomers should be foamed prior to being placed into the cement composition. As mentioned above, one advantage of using particulate foamed elastomers, as compared to unfoamed elastomers, is that the particulate foamed elastomers may stay more evenly dispersed throughout the cement composition, rather than segregating, as the cement composition sets. In certain embodiments, a particulate foamed elastomer suitable for use in the cement compositions of the present invention may comprise a polyurethane foam. Examples of suitable polyurethane foam are described in U.S. Pat. No. 4,892,891 issued to Close, the entire disclosure of which is herein incorporated by reference. While many suitable foamed elastomers are commercially available, in one embodiment, a suitable foamed elastomer may be produced by blowing air into a suitable elastomer while it is in a molten state or using an in-situ material that would evolve a gas and subsequently foam the elastomer.

In some embodiments, a particulate foamed elastomer suitable for use in the present invention may be a foamed swellable elastomer. As used herein, an elastomer is characterized as swellable when it swells upon contact with gas, hydrocarbons, or water. Foamed swellable elastomers suitable for use in some embodiments of the present invention may generally swell by up to about 50% of their original size at the surface. Under downhole conditions, this swelling may be more, or less, depending on the conditions presented. For example, the swelling may be at least 10% at downhole conditions. In some embodiments, the swelling may be up to about 50% under downhole conditions. However, as those of ordinary skill in the art, with the benefit of this disclosure, will appreciate, the actual swelling when the foamed swellable elastomer is included in a cement composition may depend on, for example, the concentration of the foamed swellable particle included in the cement composition, downhole pressure, and downhole temperature, among other factors.

Examples of suitable foamed swellable elastomers that may swell when in contact with a hydrocarbon or gas include, but are not limited to, foamed versions of the following: EPDM (ethylene propylene diene M-class rubber), polyamide, polypropylene, polyethylene, styrene butadiene, styrene, divinylbenzene, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), alkylstyrene, nitrile rubber (NBR), hydrogenated nitrile rubber (HNBR, HNS), fluoro rubbers (FKM), perfluoro rubbers (FFKM), tetrafluorethylene/propylene (TFE/P), any derivative thereof, and any combination thereof. Examples of suitable foamed swellable elastomers that may swell when in contact with water include, but are not limited to, foamed versions of the following: isobutylene maleic anhydride, starch-polyacrylate acid graft copolymer and salts thereof, polyethylene oxide polymer, carboxymethyl cellulose type polymers, polyacrylamide, poly(acrylic acid) and salts thereof, poly(acrylic acid-co-acrylamide) and salts thereof, graft-poly(ethylene oxide) of poly(acrylic acid) and salts thereof, poly(2-hydroxyethyl methacrylate), and poly(2-hydroxypropyl methacrylate), any derivative thereof and any combination thereof. Combinations of the foamed elastomers may include blends and mixtures as well as copolymers and terpolymers.

In certain embodiments, a foamed swellable elastomer may be encapsulated with a slowly water-soluble or other suitable encapsulating material so as to delay the swelling of the elastomer. Such materials are well known to those skilled in the art and function to delay the swelling of the foamed swellable elastomer for a required period of time. Examples of water-soluble and other similar encapsulating materials that may be suitable include, but are not limited to, porous solid materials such as precipitated silica, elastomers, polyvinylidene chloride (PVDC), nylon, waxes, polyurethanes, polyesters, cross-linked partially hydrolyzed acrylics, other polymeric materials, and the like.

The foamed particulate elastomer may be present in the cement compositions in an amount sufficient to provide the desired mechanical properties. In certain embodiments, the particulate foamed elastomer may be present in the cement compositions in an amount of from about 0.5% to about 50% by weight of the cement on a dry basis ("bwoc"). In other embodiments, the particulate foamed elastomer may be present in the cement compositions of from about 0.5% to about 30% by weight of the cement on a dry basis. In other embodiments, the particulate foamed elastomer may be present in the cement compositions of from about 2% to about 10% by weight of the cement on a dry basis. In some embodiments, suitable foamed particulate elastomers may be prepared by grinding a foamed elastomer into a dry powder. This preparation method does not destroy the open cell structure. Any other suitable means of producing a particulate form of the foamed elastomer may also be used. In certain embodiments, the foamed particulate elastomer comprises particles that generally range in size from about 40 to about 1000 microns. In one embodiment, the foamed particulate elastomers comprise particles below about 600 microns but above about 60 microns in size. As used herein, particle size generally refers to the length of the largest dimension of the particle. The open cell structure of the individual particles, however, includes features that are smaller in size.

As described above, the cement compositions of the present invention may comprise an aqueous fluid. Examples of suitable aqueous fluids may include fresh water, salt water, brine (e.g., saturated saltwater), or seawater. Generally, the water may be from any source, provided that it should not contain an excess of compounds that may undesirably affect other components in the cement composition. Further, the aqueous fluid may be present in an amount sufficient to form a pumpable slurry. In certain embodiments, the aqueous fluid may be present in the cement composition in an amount of from about 33% to about 200% bwoc. In other embodiments, the aqueous fluid may be present in the cement composition of from about 35% to about 70% bwoc. One of ordinary skill in the art with the benefit of this disclosure will recognize the appropriate amount of aqueous fluid for a chosen application.

Additives suitable for use in subterranean cementing operations also may be included in the cement compositions of the present invention. Examples of such additives may include, but are not limited to, strength-retrogression additives, set accelerators, set retarders, weighting agents, weight-reducing additives, heavyweight additives, lost-circulation materials, filtration-control additives, dispersants, defoaming agents, foaming agents, and combinations thereof. Specific examples of these, and other, additives include crystalline silica, amorphous silica, salts, fibers (including, but not limited to, glass, carbon, and metal fibers), hydratable clays, vitrified shale, microspheres, fly ash, lime, latex, thixotropic additives, combinations thereof and the like. A person having ordinary skill in the art, with the benefit of this disclosure, will readily be able to determine the type and amount of additive useful for a particular application and desired result.

As will be appreciated by those of ordinary skill in the art, the cement compositions of the present invention may be used in a variety of subterranean applications, including primary and remedial cementing. For example, the cement compositions may be introduced into a subterranean formation and allowed to set. By way of example, in primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in example remedial cementing embodiments, a cement composition of the present invention may be used, for example, in squeeze cementing operations or in the placement of cement plugs. In some embodiments, a cement composition of the present invention may be placed in or near a crack in a cement matrix so that a foamed particulate elastomer may swell to fill the crack.

To facilitate a better understanding of the present invention, the following examples of certain aspects of some embodiments are given. In no way should the following examples be read to limit, or define, the entire scope of the invention.

Example 1

A 16.4 lb/gal Portland class H cement slurry was prepared. A polyurethane foam ground below 80 microns in particle size was added to the slurry. For comparison purposes, several samples were prepared with the polyurethane foam present in concentrations of 1% and 5% by weight of cement. After preparation, the slurries were cured at 140° F. for 7 days. The samples were prepped for mechanical property evaluation following ASTM D 4543. The Young's modulus, Poisson's ratio, and compressive strength were tested following ASTM D 3148-02. The tensile strength was measured following ASTM D 3967. Physical and mechanical properties are reported in Table 1 and Table 2.

TABLE 1

| Polyurethane, by weight of cement | Compressive Strength (psi) | Young's Modulus | Poisson's Ratio |
|---|---|---|---|
| 1% | 6,148 | 1.88E+06 | 0.179 |
| 1% | 6,907 | 1.98E+06 | 0.210 |
| 1% | 6,822 | 1.95E+06 | 0.222 |
| 5% | 5,490 | 1.46E+06 | 0.217 |
| 5% | 5,303 | 1.46E+06 | 0.197 |
| 5% | 5,690 | 1.43E+06 | 0.203 |

TABLE 2

| Polyurethane, by weight of cement | Tensile Strength (psi) | Average Brazilian Tensile Strength (psi) |
|---|---|---|
| 1% | 594 | 573 |
| 1% | 551 | |
| 1% | 517 | |
| 1% | 632 | |
| 5% | 580 | 565 |
| 5% | 601 | |
| 5% | 571 | |
| 5% | 509 | |

As illustrated in Tables 1 and 2, the use of particulate polyurethane foam may provide a set cement with desirable properties.

Example 2

To further evaluate the use of particulate polyurethane foam, another 16.4 lb/gal Portland class H cement slurry was prepared. A particulate polyurethane foam was added to the slurry. For comparison purposes, several samples were prepared with the polyurethane foam present in concentrations of 5% and 10% by weight of cement. After preparation, the slurries were cured at 3000 psi and 140° F. for 7 days. The samples were prepped for mechanical property evaluation following ASTM D 4543. The Young's modulus, Poisson's ratio, and compressive strength were tested following ASTM D 3148-02. The tensile strength was measured following ASTM D 3967. Physical and mechanical properties are reported in Table 3 and Table 4.

TABLE 3

| Polyurethane, by weight of cement | Compressive Strength (psi) | Young's Modulus | Poisson's Ratio |
|---|---|---|---|
| 5% | 2,288 | 1.07E+06 | 0.143 |
| 5% | 2,162 | 1.08E+06 | 0.141 |
| 5% | 2,223 | 1.14E+06 | 0.159 |
| 10% | 1,610 | 8.36E+05 | 0.156 |
| 10% | 1,402 | 7.53E+05 | 0.128 |
| 10% | 1,585 | 8.76E+05 | 0.110 |

TABLE 4

| Polyurethane, by weight of cement | Tensile Strength (psi) | Average Brazilian Tensile Strength (psi) |
|---|---|---|
| 5% | 192 | 228 |
| 5% | 262 | |
| 5% | 229 | |
| 5% | 230 | |
| 10% | 187 | 185 |
| 10% | 161 | |
| 10% | 189 | |
| 10% | 205 | |

As illustrated in Tables 3 and 4, the use of particulate polyurethane foam may provide a set cement with desirable properties.

Example 3

To evaluate the physical and mechanical properties of cement compositions comprising particulate polyurethane foam, as compared to cement compositions comprising unfoamed elastomers, several cement compositions comprising either particulate polyurethane foam or unfoamed elastomers of a styrene-butadiene rubber ("SBR") block copolymer were prepared. Several 16.4 lb/gal Portland class H cement slurries were prepared. Particulate polyurethane foam or unfoamed SBR elastomers were added to the cement slurries as indicated in the tables below. The elastomers were present in both types of cement compositions in an amount of 5% by weight of cement. After preparation, the slurries were cured at 3000 psi and 140° F. for 7 days. The confining pressure of the samples was 0 psi.

The samples were prepped for mechanical property evaluation following ASTM D 4543. The Young's modulus and Poisson's ratio were tested following ASTM D 3148-02. The unconfined compressive strength was measured following ASTM D 2664-95a. Physical and mechanical properties for cement compositions comprising particulate polyurethane foam are reported in Table 5. Physical and mechanical properties for cement compositions comprising unfoamed elastomers are reported in Table 6.

TABLE 5

| Polyurethane, by weight of cement | Compressive Strength (psi) | Young's Modulus | Poisson's Ratio |
|---|---|---|---|
| 5% | 2,288 | 1.07E+06 | 0.143 |
| 5% | 2,162 | 1.08E+06 | 0.141 |
| 5% | 5% | 2,223 | 1.14E+06 | 0.159 |
| 10% | 1,610 | 8.36E+05 | 0.156 |
| 10% | 1,402 | 7.53E+05 | 0.128 |
| 10% | 1,585 | 8.76E+05 | 0.110 |

TABLE 5-continued

| Polyurethane, by weight of cement | Compressive Strength (psi) | Young's Modulus | Poisson's Ratio |
|---|---|---|---|

TABLE 6

| SBR, by weight of cement | Compressive Strength (psi) | Young's Modulus | Poisson's Ratio |
|---|---|---|---|
| 5% | 7,190 | 1.85E+06 | 0.169 |
| 5% | 7,554 | 1.92E+06 | 0.174 |
| 5% | 7,614 | 1.94E+06 | 0.191 |
| 10% | 4,834 | 1.36E+06 | 0.177 |
| 10% | 5,417 | 1.61E+06 | 0.215 |
| 10% | 5,334 | 1.59E+06 | 0.213 |

As illustrated in Tables 5 and 6, the use of particulate polyurethane foam may provide a set cement with desirable properties.

Example 4

Swelling tests were conducted on two 1 cm×1 cm square samples of foamed EPDM rubber. One sample was placed in water as a control while the other sample was placed in ESCAID™ 110 hydrocarbon commercially available from Exxon Mobil. Physical properties of each sample are reported in Table 5.

The same swelling test was performed on a cement composition comprising foamed EPDM rubber in an amount of 10% by weight of cement. The elastomer swelled approximately 20% in size.

TABLE 7

| Time (min) | Sample in Water | Sample in Oil |
|---|---|---|
| 0 | — | — |
| 5 min. | No change | 10% expansion |
| 10 min. | No change | 20% expansion |
| 25 min. | No change | 20% expansion |
| 45 min. | No change | 20% expansion |
| 24 hours | No change | 20% expansion |

As illustrated in Table 7, the use of a foamed swellable elastomer may provide a cement composition with desirable properties.

Example 5

To evaluate the segregation properties of cement compositions comprising particulate polyurethane foam, as compared to cement compositions comprising unfoamed elastomers, two cement compositions comprising either particulate polyurethane foam or unfoamed elastomers of a styrene-butadiene rubber ("SBR") block copolymer were prepared. Two 16.0 lb/gal Portland class H cement slurries were prepared. Particulate polyurethane foam with an average size of about 3000 microns or unfoamed SBR elastomers were added to the cement slurries in an amount of 10% by weight of cement. In addition, the cement slurries comprised a dispersant in an amount of 1% by weight of cement. After curing, the cement samples were cut into 3 segments in order to determine the density of the sample at the top, middle and bottom of the sample. Density variation from top to bottom is an indication of slurry segregation that may be caused by heavy particles tending to settle to the bottom and light particles tending to migrate toward the top. Density measurements were made using Archimedes principle. The segregation characteristics for the cement compositions after 24 hours are reported in Table 8.

TABLE 8

|  | Density of slurry segment containing particulate unfoamed elastomer (ppg) | Density of slurry segment containing particulate polyurethane foam (ppg) |
|---|---|---|
| Top | 15.86 | 15.88 |
| Middle | 15.93 | 15.86 |
| Bottom | 16.37 | 15.99 |

As illustrated in Table 8, the use of a foamed swellable elastomer may provide a cement composition with more desirable settling properties.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A cement composition comprising:
   a hydraulic cement,
   a particulate foamed swellable elastomer, wherein the particulate foamed swellable elastomer has an open cell structure, and wherein the particulate foamed swellable elastomer swells when contacted by gas, hydrocarbons, and/or water for providing self-healing properties when the cured cement composition is damaged or cracked, and
   an aqueous fluid.

2. The cement composition of claim 1 wherein the particulate foamed swellable elastomer comprises polyurethane foam.

3. The composition of claim 1 wherein the particulate foamed swellable elastomer comprises at least one foamed oil-swellable elastomer selected from the group consisting of ethylene propylene diene M-class rubber, polyamide, polypropylene, polyethylene, styrene butadiene, styrene, divinylbenzene, natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene-propylene rubber, ethylene-propylene-diene terpolymer rubber, ethylene vinyl acetate copolymer, fluorosilicone rubbers, silicone rubbers, poly 2,2,1-bicyclo heptene (polynorborneane), alkylstyrene, nitrile rubber, hydrogenated nitrile rubber, fluoro rubbers, perfluoro rubbers, tetrafluorethylene/propylene, and any combination thereof.

4. The composition of claim 1 wherein the particulate foamed swellable elastomer comprises at least one foamed water-swellable elastomer selected from the group consisting of isobutylene maleic anhydride, starch-polyacrylate acid graft copolymer and salts thereof, polyethylene oxide polymer, carboxymethyl cellulose type polymers, polyacrylamide, poly(acrylic acid) and salts thereof, poly(acrylic acid-co-acrylamide) and salts thereof, graft-poly(ethylene oxide) of poly(acrylic acid) and salts thereof, poly(2-hydroxyethyl methacrylate), and poly(2-hydroxypropyl methacrylate), and any combination thereof.

5. The composition of claim 1 wherein the particulate foamed swellable elastomer is present in the cement composition in an amount of from about 0.5% to about 30% by weight of the hydraulic cement.

6. The composition of claim 1 wherein the particulate foamed swellable elastomer is present in the cement composition in an amount of from about 2% to about 10% by weight of the hydraulic cement.

7. The composition of claim 1 wherein the particulate foamed swellable elastomer comprises particulates with a size of from about 40 to about 1000 microns.

8. The composition of claim 1 wherein the hydraulic cement comprises at least one hydraulic cement selected from the group consisting of a Portland cement, a pozzolana cement, a gypsum cement, a high-alumina-content cement, a slag cement, a silica cement, cement kiln dust, and combinations thereof.

9. The composition of claim 1 wherein the particulate foamed swellable elastomer comprises particulates with a size of from about 60 to about 600 microns.

10. The composition of claim 1 wherein the particulate foamed swellable elastomer comprises styrene butadiene.

11. A cement composition comprising:
    a hydraulic cement,
    a particulate foamed swellable elastomer, wherein the particulate foamed swellable elastomer has an open cell structure, and wherein the particulate foamed swellable elastomer swells when contacted by gas, hydrocarbons, and/or water for providing self-healing properties when the cured cement composition is damaged or cracked, and
    a filtration control additive, and
    an aqueous fluid.

12. The composition of claim 11 wherein the particulate foamed elastomer comprises at least one foamed oil-swellable elastomer selected from the group consisting of ethylene propylene diene M-class rubber, polyamide, polypropylene, polyethylene, styrene butadiene, styrene, divinylbenzene, natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene-propylene rubber, ethylene-propylene-diene terpolymer rubber, ethylene vinyl acetate copolymer, fluorosilicone rubbers, silicone rubbers, poly 2,2,1-bicyclo heptene (polynorborneane), alkylstyrene, nitrile rubber, hydrogenated nitrile rubber, fluoro rubbers, perfluoro rubbers, tetrafluorethylene/propylene, and any combination thereof.

13. The composition of claim 11 wherein the particulate foamed elastomer is present in the cement composition in an amount of from about 0.5% to about 30% by weight of the hydraulic cement.

14. The composition of claim 11 wherein the particulate foamed elastomer is present in the cement composition in an amount of from about 2% to about 10% by weight of the hydraulic cement.

15. The composition of claim 11 wherein the particulate foamed elastomer comprises particulates with a size of from about 40 to about 1000 microns.

16. The composition of claim 11 wherein the hydraulic cement comprises at least one hydraulic cement selected from the group consisting of a Portland cement, a pozzolana cement, a gypsum cement, a high-alumina-content cement, a slag cement, a silica cement, cement kiln dust, and combinations thereof.

17. The composition of claim 11 wherein the particulate foamed elastomer comprises particulates with a size of from about 60 to about 600 microns.

18. The composition of claim 11 wherein the particulate foamed elastomer comprises styrene butadiene.

* * * * *